(12) United States Patent
Miyazaki et al.

(10) Patent No.: US 11,283,136 B2
(45) Date of Patent: Mar. 22, 2022

(54) ENERGY STORAGE DEVICE AND METHOD OF PRODUCING ENERGY STORAGE DEVICE

(71) Applicant: GS Yuasa International Ltd., Kyoto (JP)

(72) Inventors: Akihiko Miyazaki, Kyoto (JP); Sumio Mori, Kyoto (JP); Tomonori Kako, Kyoto (JP)

(73) Assignee: GS Yuasa International Ltd., Kyoto (JP)

(*) Notice: Subject to any disclaimer, the term of this patent is extended or adjusted under 35 U.S.C. 154(b) by 1135 days.

(21) Appl. No.: 14/863,927

(22) Filed: Sep. 24, 2015

(65) Prior Publication Data

US 2016/0093860 A1 Mar. 31, 2016

(30) Foreign Application Priority Data

Sep. 29, 2014 (JP) .............................. JP2014-198068
Aug. 31, 2015 (JP) .............................. JP2015-170742

(51) Int. Cl.
| *H01M 2/16* | (2006.01) |
| *H01M 50/449* | (2021.01) |
| *H01M 4/133* | (2010.01) |
| *H01M 4/587* | (2010.01) |
| *H01M 10/0525* | (2010.01) |
| *H01M 10/058* | (2010.01) |
| *H01M 50/403* | (2021.01) |

(52) U.S. Cl.
CPC ......... *H01M 50/449* (2021.01); *H01M 4/133* (2013.01); *H01M 4/587* (2013.01); *H01M 10/058* (2013.01); *H01M 10/0525* (2013.01); *H01M 50/403* (2021.01); *Y02T 10/70* (2013.01)

(58) Field of Classification Search
CPC .... H01M 2/1686; H01M 2/145; H01M 4/133; H01M 4/587; H01M 2004/027
USPC .................................. 429/144, 247; 264/129
See application file for complete search history.

(56) References Cited

U.S. PATENT DOCUMENTS

| 5,667,911 | A  | * | 9/1997 | Yu ............................ | B29C 55/06 |
| | | | | | 29/623.1 |
| 6,998,193 | B2 | * | 2/2006 | Sun ....................... | B01D 67/003 |
| | | | | | 429/247 |
| 9,455,432 | B2 | * | 9/2016 | Shi ........................ | H01M 2/1686 |
| 2005/0208383 | A1 | * | 9/2005 | Totsuka ................ | H01M 2/162 |
| | | | | | 429/247 |

(Continued)

FOREIGN PATENT DOCUMENTS

| CN | 103579551 A | 2/2014 |
| JP | 63-72063 A | 4/1988 |

(Continued)

*Primary Examiner* — Victoria H Lynch
(74) *Attorney, Agent, or Firm* — Rankin, Hill & Clark LLP

(57) ABSTRACT

An energy storage device includes a positive electrode provided with a positive composite layer containing a positive active material, a negative electrode provided with a negative composite layer containing a negative active material, and a separator partitioning between the positive electrode and the negative electrode, wherein the separator includes a substrate uniaxially drawn into a sheet shape and a coating layer coating at least one of surfaces of the substrate, and the coating layer has an anisotropic structure with orientation in a direction different from a drawing direction of the substrate.

11 Claims, 6 Drawing Sheets

(56) References Cited

U.S. PATENT DOCUMENTS

| | | |
|---|---|---|
| 2007/0264577 A1 | 11/2007 | Toshihiro |
| 2009/0067119 A1 | 3/2009 | Nobuaki |
| 2009/0226813 A1 | 9/2009 | Takita et al. |
| 2010/0196750 A1 | 8/2010 | Takuya |
| 2011/0003209 A1 | 1/2011 | Katayama et al. |
| 2011/0223464 A1* | 9/2011 | Viavattine ............... H01M 2/16 429/144 |
| 2013/0034777 A1 | 2/2013 | Takita et al. |
| 2013/0130092 A1* | 5/2013 | Roth ................... H01M 50/449 429/144 |
| 2014/0154557 A1 | 6/2014 | Mori et al. |
| 2014/0272533 A1 | 9/2014 | Shi et al. |
| 2015/0340677 A1* | 11/2015 | Miyazaki ............ H01M 2/1673 320/134 |

FOREIGN PATENT DOCUMENTS

| | | |
|---|---|---|
| JP | 2000299094 A2 | 10/2000 |
| JP | 2002110132 A2 | 4/2002 |
| JP | 2008004442 A2 | 1/2008 |
| JP | 2009-224341 A | 10/2009 |
| JP | 2010044935 A2 | 2/2010 |
| JP | 2010205719 A2 | 9/2010 |
| JP | 2011-515512 A | 5/2011 |
| JP | 2011146365 A2 | 7/2011 |
| JP | 2012003938 A2 | 1/2012 |
| JP | 2013037853 A2 | 2/2013 |
| JP | 2013037854 A2 | 2/2013 |
| JP | 2014-132563 A | 7/2014 |
| WO | 2007066768 A1 | 6/2007 |
| WO | 2014/136813 A1 | 9/2014 |

* cited by examiner

ENERGY STORAGE DEVICE AND METHOD OF PRODUCING ENERGY STORAGE DEVICE

CROSS REFERENCE TO RELATED APPLICATIONS

This application claims the benefit of Japanese patent applications No. 2014-198068, filed on Sep. 29, 2014, and No. 2015-170742, filed on Aug. 31, 2015, which are incorporated by reference.

FIELD

The present invention relates to an energy storage device that includes a positive electrode provided with a positive composite layer containing a positive active material, a negative electrode provided with a negative composite layer containing a negative active material, and a separator partitioning between the positive electrode and the negative electrode. The present invention also relates to a method of producing the energy storage device.

BACKGROUND

A lithium ion battery, which is a typical energy storage device, includes a layered product provided with positive and negative electrodes each formed by applying a positive or negative composite to a substrate in a belt shape, and a separator partitioning between the positive and negative electrodes being layered. A method of producing such a lithium ion battery includes the step of forming a power generating element by winding the layered product including the positive electrode, the separator, and the negative electrode with a winding device. The separator receives tensile force generated by the winding process. The separator is accordingly required to have at least certain strength durable against the winding process.

The separator included in the energy storage device is prepared by uniaxially drawing (stretching) a resin material in some cases. Accordingly, the resin of the separator is typically oriented in its longitudinal direction agreeing with its drawing direction. The separator thus has relatively large strength in an MD direction agreeing with the drawing direction. The separator tends to have smaller strength in a TD direction (a width direction) perpendicular to the drawing direction than the strength in the MD direction because the resin is not oriented in the TD direction. The winding of the layered product laterally unbalances tensile force applied to the separator in the layered product if tension is slightly unbalanced between the both ends in the TD direction by the winding process with a winding device. Tensile force (stress) may be generated in the TD direction in addition to the tensile force in the MD direction in this case. Such tension in the TD direction may tear the uniaxially drawn separator parallelly to the MD direction.

A separator needs to be improved in strength in order to prevent deformation and tear of the separator during production of an energy storage device. Examples of measures therefor include multilayering the separator. An exemplary separator included in a conventional lithium ion battery has a porous resin layer serving as a substrate and a second porous layer that is provided on the porous resin layer and containing fillers and a fibrous substance (see JP-A-2011-146365, for example). According to JP-A-2011-146365, the fibrous substance as well as the fillers is added to the second porous layer to secure stability in shape and flexibility of the separator.

There is also a separator in a double layer structure including a first layer made of porous resin and a second layer provided as a porous film containing particles and fibrils (see JP-A-2010-205719, for example). According to JP-A-2010-205719, the fibrils in the second layer are continuously connected to one another into a three-dimensional network structure, so that the separator has flexibility and the like.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The second porous layer disclosed in JP-A-2011-146365 suppresses thermal contraction of the separator while the lithium ion battery is charged and discharged so as to prevent short circuit and improve stability of the lithium ion battery. The second layer disclosed in JP-A-2010-205719 is provided to the separator for its flexibility. Even in a case where the separator is torn due to contaminations or dendrites generated during charging and discharging, the separator thus follows the shapes of the contaminations or the dendrites to secure the insulation property and improve safety of the lithium ion battery. As described above, the conventional techniques were developed mainly for improvement in stability of the separator of the lithium ion battery in use, without consideration of improvement in durability or reliability by focusing on possible defects of the separator during production of the lithium ion battery.

The present invention has been made in view of the above, and an object of the present invention is to provide an energy storage device like a lithium ion battery, which has no defect such as deformation or tear possibly caused to a separator particularly during production of the energy storage device and is thus excellent in durability and reliability. Another object of the present invention is to provide a method of producing such an energy storage device excellent in durability and reliability.

An energy storage device according to an aspect of the present invention includes: a positive electrode provided with a positive composite layer containing a positive active material; a negative electrode provided with a negative composite layer containing a negative active material; and a separator partitioning between the positive electrode and the negative electrode, wherein the separator includes a substrate uniaxially drawn into a sheet shape and a coating layer coating at least one of surfaces of the substrate, and the coating layer has an anisotropic structure with orientation in a direction different from a drawing direction of the substrate.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
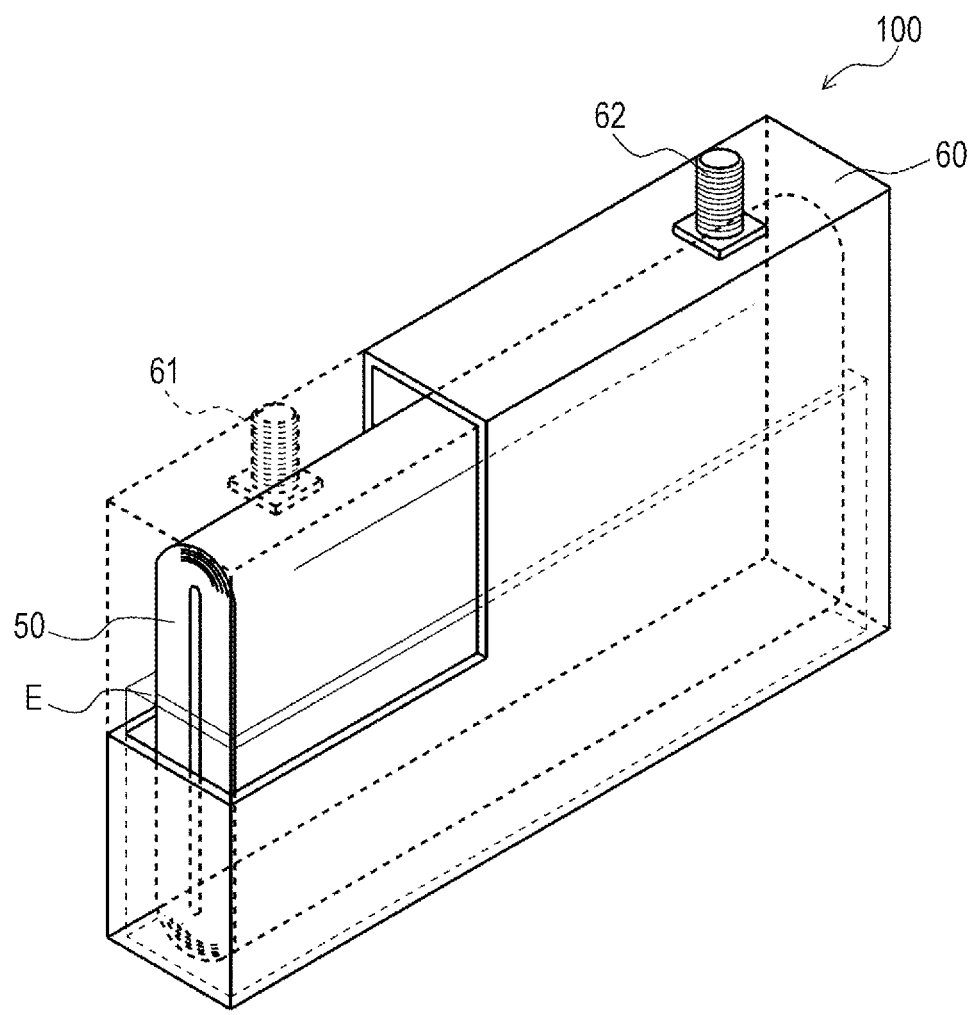
FIG. 1 is a perspective view of a lithium ion battery being partially cut away.

An energy storage device according to an aspect of the present invention includes: a positive electrode provided with a positive composite layer containing a positive active material; a negative electrode provided with a negative composite layer containing a negative active material; and a separator partitioning between the positive electrode and the negative electrode, wherein the separator includes a substrate uniaxially drawn into a sheet shape and a coating layer coating at least one of surfaces of the substrate, and the coating layer has an anisotropic structure with orientation in a direction different from a drawing direction of the substrate.

As described above, deformation and tear of the separator is relevant to the drawing direction of the substrate. The substrate uniaxially drawn into the sheet shape keeps certain strength in an MD direction agreeing with the drawing direction but may not keep sufficient strength in a TD direction perpendicular to the drawing direction. The inventors of the present invention devised, through intensive researches, the configuration of the coating layer provided on the substrate to achieve the present invention with successful improvement in strength of the entire separator.

Specifically, the energy storage device thus configured is provided, on at least one of the surfaces of the substrate included in the separator, with the coating layer having the anisotropic structure with orientation in the direction different from the drawing direction of the substrate. The coating layer reinforces the substrate in a direction other than the MD direction in this case. Even in a case where stress is applied to the separator in a direction other than the MD direction, the anisotropic structure of the coating layer receives the stress so as to suppress deformation and tear of the separator. The present invention can thus provide the energy storage device excellent in durability and reliability.

In the energy storage device according to another aspect of the present invention, the coating layer preferably has, as the anisotropic structure, a vertically oriented structure with orientation in a direction perpendicular to the drawing direction of the substrate.

The energy storage device thus configured has the vertically oriented structure including the coating layer oriented in the direction perpendicular to the drawing direction of the substrate. When tensile force is applied to the separator in the TD direction, the vertically oriented structure of the coating layer reliably receives the tensile force so as to prevent deformation and tear of the separator.

In the energy storage device according to still another aspect of the present invention, the coating layer preferably has, as the anisotropic structure, a symmetrically oriented structure symmetric with respect to a line in the drawing direction of the substrate.

The energy storage device thus configured has the symmetrically oriented structure including the coating layer provided symmetrically with respect to a line in the drawing direction of the substrate. When stress is applied to the separator in a direction other than the MD direction, the symmetrically oriented structure of the coating layer receives the stress with good balance by dispersing the stress to opposite sides of the separator. This configuration thus prevents deformation and tear of the separator.

In the energy storage device according to still another aspect of the present invention, the separator preferably has a ratio ($S_{TD}/S_{MD}$) regulated to at least 0.3, between tensile strength $S_{TD}$ in a direction perpendicular to the drawing direction of the substrate and tensile strength $S_{MD}$ in the drawing direction of the substrate.

The energy storage device thus configured regulates the tensile strength $S_{TD}$/tensile strength $S_{MD}$ to at least 0.3 so as to constantly keep the tensile strength $S_{TD}$. The coating layer reinforces the separator with good balance in the TD direction along which the substrate alone is difficult to keep strength, so as to prevent deformation and tear of the separator.

In the energy storage device according to still another aspect of the present invention, the separator preferably has the tensile strength $S_{TD}$ in the direction perpendicular to the drawing direction of the substrate being regulated to at least 40 N/mm².

The energy storage device thus configured regulates the tensile strength $S_{TD}$ to at least 40 N/mm², so that the coating layer reliably reinforces the separator in the TD direction along which the substrate alone is difficult to keep strength, so as to prevent deformation and tear of the separator.

In the energy storage device according to still another aspect of the present invention, the coating layer is preferably made of a composite material containing fibers having orientation, fillers, and a binder.

In the energy storage device thus configured, the coating layer is made of the composite material containing the fibers having orientation, the fillers, and the binder, so as to effectively reinforce the substrate and improve strength of the entire separator. In particular, blending the fibers having orientation reliably achieves the anisotropic structure in the coating layer.

In the energy storage device according to still another aspect of the present invention, the negative active material is preferably hard carbon having a particle diameter (d50) ranging from 2 to 8 µm.

In the energy storage device thus configured, the negative active material contained in the negative composite layer of the negative electrode is hard carbon having a particle diameter (d50) ranging from 2 to 8 µm. The negative electrode is thus unlikely to expand in volume so as to keep surface flatness of the electrode during production as well as in use. Even in a state where the separator and the negative electrode are layered and the coating layer and the negative composite layer face each other, the negative electrode will not apply excessive stress to the separator. This configuration and reinforcement of the substrate by the anisotropic structure of the coating layer synergistically reliably prevent deformation and tear of the separator.

According to another aspect of the present invention, there is provided a method of producing an energy storage device including a positive electrode provided with a positive composite layer containing a positive active material, a negative electrode provided with a negative composite layer containing a negative active material, and a separator partitioning between the positive electrode and the negative electrode being layered, wherein the separator is formed through forming a substrate by uniaxially drawing a porous material into a sheet shape, and applying a material containing resin to at least one of surfaces of the substrate and forming a coating layer, and the material containing the resin is applied in a direction different from a drawing direction of the substrate in the coating layer forming step.

In the method of producing the energy storage device thus configured, the material containing the resin is applied in the direction different from the drawing direction of the substrate in the coating layer forming step. The coating layer is accordingly oriented in the direction different from the drawing direction of the substrate so as to reinforce the substrate in a direction other than the MD direction. Even in a case where stress in a direction other than the MD direction is applied to the separator, the coating layer thus oriented receives the stress so as to suppress deformation and tear of the separator. The present invention can thus provide the energy storage device excellent in durability and reliability.

An energy storage device according to each of the embodiments of the present invention will now be described below with reference to FIGS. 1 to 7. A method of producing an energy storage device will be also referred to in the description of the energy storage device according to each of the embodiments. Each of the following embodiments will particularly exemplify a lithium ion battery as an energy storage device. The present invention is, however, not intended to be limited to the configurations referred to in the following embodiments and in the drawings.

(Lithium Ion Battery)

Figure 2:
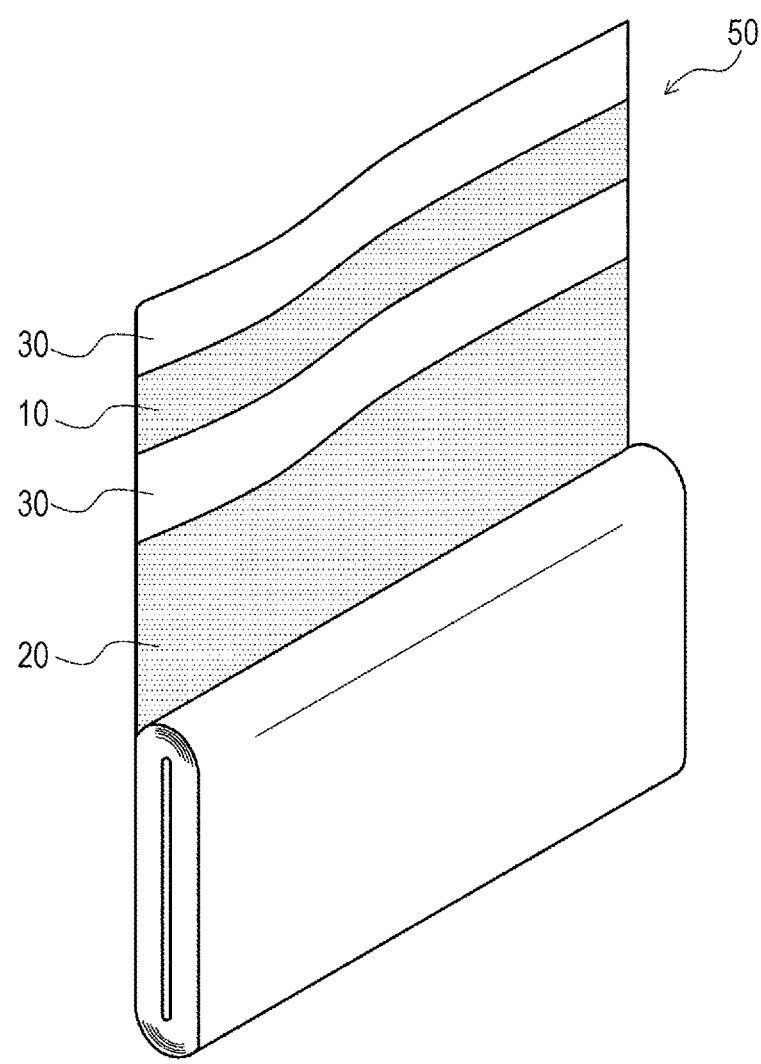
FIG. 2 is a perspective view of a power generating element accommodated in a battery case of the lithium ion battery shown in FIG. 1.

FIG. 1 is a perspective view of a lithium ion battery 100 being partially cut away, according to the present embodiment. FIG. 2 is a perspective view of a power generating element 50 accommodated in a battery case 60 of the lithium ion battery 100 shown in FIG. 1. FIG. 2 shows a state where the wound power generating element 50 is partially unwound in order for easier comprehension of a configuration of the power generating element 50. FIGS. 1 and 2 are both schematic views without showing detailed configurations unnecessary for description of the present invention.

As shown in FIG. 1, the battery case 60 of the lithium ion battery 100 serves as a casing including a positive electrode terminal 61 and a negative electrode terminal 62, accommodates the power generating element 50, and is filled with an electrolyte solution E containing a nonaqueous electrolyte. As shown in FIG. 2, the power generating element 50 is formed by winding a layered product including a separator 30, a positive electrode 10, a separator 30, and a negative electrode 20 layered in the mentioned order. The positive electrode 10 and the negative electrode 20 are partitioned by the adjacent separator 30 in this layered product. The positive electrode 10 and the negative electrode 20 are not in contact with each other but are physically insulated from each other in the layered product thus wound. In the power generating element 50, the positive electrode 10 is connected to the positive electrode terminal 61 and the negative electrode 20 is connected to the negative electrode terminal 62. The electrolyte solution E filled in the battery case 60 is absorbed by the positive electrode 10, the negative electrode 20, and the separators 30 in the power generating element 50 that comes into a wet state. Li ions contained in the electrolyte solution E thus become movable between the positive electrode 10 and the negative electrode 20 via the separator 30. The electrolyte solution E is filled in the battery case 60 by an appropriate amount for causing at least the power generating element 50 to absorb the electrolyte solution E and be brought into a substantially completely wet state. Because the positive electrode 10 and the negative electrode 20 included in the power generating element 50 may be changed in volume during charging and discharging, the electrolyte solution E is preferred to be filled excessively so as to partially immerse the power generating element 50 in the battery case 60 as shown in FIG. 1. The amount of the electrolyte solution E filled in the battery case 60 can be regulated appropriately in consideration of balance between prevention of insufficient absorption in the power generating element 50 and pressure in the battery case. A configuration of the lithium ion battery 100 will now be described in detail below.

(Power Generating Element)

Figure 3:
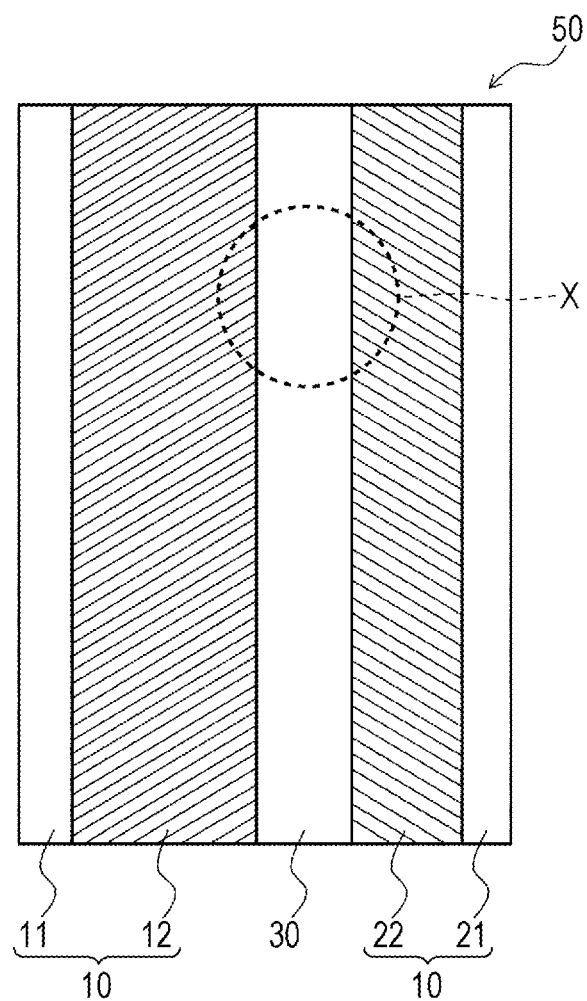
FIG. 3 is a schematic sectional view of a configuration of the power generating element.

FIG. 3 is a schematic sectional view of the configuration of the power generating element 50. The power generating element 50 includes the positive electrode 10, the negative electrode 20, and the separator 30 as basic configurations.

<Positive Electrode>

The positive electrode 10 includes a positive electrode current collector 11 and a positive composite layer 12 provided on a surface of the positive electrode current collector 11. The positive electrode current collector 11 is provided as foil or a film made of a conductive material. Examples of the conductive material include aluminum, titanium, nickel, tantalum, silver, copper, platinum, gold, iron, stainless steel, carbon, and a conductive polymer. The positive electrode current collector 11 is preferably provided as aluminum foil. The aluminum foil is typically in a stable state with a surface thereof being coated with oxide (alumina), and can be easily processed by bending, winding, and the like. The aluminum foil is thus preferred as a positive electrode member of the lithium ion battery. The positive electrode current collector 11 can be surface treated with any other conductive material. The positive electrode current collector 11 is 10 to 30 µm and preferably 12 to 20 µm in thickness. The positive electrode 10 may have insufficient mechanical strength if the positive electrode current collector 11 is less than 10 µm in thickness. In contrast, if the positive electrode current collector 11 exceeds 30 µm in thickness, the entire lithium ion battery is increased in capacity and weight to deteriorate packaging efficiency.

The positive composite layer 12 contains a positive active material and a binder. The positive active material to be used can store or adsorb Li ions as well as can emit the Li ions. Examples of the positive active material include an olivine lithium phosphate compound expressed by a general formula $LiMPO_4$ (where M indicates at least one of the transition metal elements) and a spinel lithium transition metal compound such as $LiMn_2O_4$. Examples of the olivine lithium phosphate compound include transition metal lithium phosphate compounds such as $LiFePO_4$, $LiMnPO_4$, $LiNiPO_4$, and $LiCoPO_4$. Among these compounds, $LiFePO_4$ is preferably used as the positive active material because it is partially made of iron as a rich resource and is expected to exert energy density equivalent to that of a conventional lithium ion battery. The positive active material can be alternatively expressed by a composition formula $Li_xMn_aNi_bCo_cO_d$ ($0<x<1.3$, $a+b+c=1$, and $1.7 \leq d \leq 2.3$).

The binder bonds the positive active material and can be of the hydrophilic type or the hydrophobic type. Examples of the hydrophilic binder include polyacrylic acid (PAA), carboxymethyl cellulose (CMC), polyvinyl alcohol (PVA), and polyethylene oxide (PEO), as well as polymeric salts and derivatives thereof. Each of the hydrophilic binders exemplified above can be used alone or a mixture of two or more of the hydrophilic binders can be used alternatively. Examples of the hydrophobic binder include polyvinylidene fluoride (PVDF), polytetrafluoroethylene (PTFE), polyethylene (PE), polypropylene (PP), ethylene-propylene-diene ternary copolymer (EPDM), sulfonated ethylene-propylene rubber, styrene-butadiene rubber (SBR), and fluororubber, as well as polymeric salts and derivatives thereof. Each of the hydrophobic binders exemplified above can be used alone or a mixture of two or more of the hydrophobic binders can be used alternatively.

Prepared to form the positive composite layer 12 on the surface of the positive electrode current collector 11 is positive electrode paste by dissolving or dispersing the binder in a solvent, mixing a binder solution (a dispersing element) and the positive active material, for example. The solvent used for preparation of the positive electrode paste is determined in accordance with the type of the binder blended with the positive active material. When the hydrophilic binder is used to prepare the positive electrode paste, a water-soluble solvent such as water, alcohol, or acetic acid is used as the solvent. When the hydrophobic binder is used, a lipophilic solvent such as N-methyl-2-pyrrolidone (NMP), xylene, or toluene is used as the solvent.

A conductive assistant can be added to the positive electrode paste in order for improvement in conductivity of the positive electrode 10. The conductive assistant is made of an electron conductive material that does not adversely affects performance of the battery. Examples of such a conductive assistant include acetylene black, ketjen black, carbon black, carbon whisker, carbon fiber, natural graphite, artificial graphite, metal powder, and conductive ceramics. Each of the conductive assistants exemplified above can be used alone or a mixture of two or more of the conductive assistants can be used alternatively.

The positive electrode paste can be applied to the surface of the positive electrode current collector 11 with an application device such as a bar coater, a roll coater, a die coater, or a gravure coater. If the positive electrode paste has sufficiently small viscosity, the paste can be applied to the surface of the positive electrode current collector 11 by spraying with a spray device. The positive electrode paste thus applied is dried to remove by volatilizing the solvent in the paste. The positive electrode 10 is then rolled to predetermined thickness with a pressing device or the like.

<Negative Electrode>

The negative electrode 20 includes a negative electrode current collector 21 and a negative composite layer 22 provided on a surface of the negative electrode current collector 21. The material for the negative electrode current collector 21 and its thickness are similar to those of the positive electrode current collector 11 included in the positive electrode 10. Accordingly, detailed description thereof will not be provided repeatedly.

The negative composite layer 22 contains a negative active material and a binder. The negative active material to be used can store or adsorb Li ions as well as can emit the Li ions. Examples of the negative active material include hard carbon, soft carbon, graphite, and lithium titanate having a spinel crystal structure. The negative active material according to the present invention is preferably hard carbon in order for suppression of expansion in volume of the negative electrode as to be described later. A particle size can be measured in accordance with the laser diffraction scattering method. Reference sign d50 indicates a particle size corresponding to 50% of volumes on volume distribution of particles measured in accordance with the laser diffraction scattering method.

The binder bonds the negative active material and can be of the hydrophilic type or the hydrophobic type. The type and selection of the binder are similar to those of the binder included in the positive electrode 10. Accordingly, detailed description thereof will not be provided repeatedly.

Prepared to form the negative composite layer 22 on the surface of the negative electrode current collector 21 is negative electrode paste by adding a solvent to a mixture of the negative active material and the binder and blending the mixture and the solvent. The solvent used for preparation of the negative electrode paste is determined in accordance with the type of the binder blended with the negative active material, similarly to the solvent used for preparation of the positive electrode paste. Accordingly, detailed description thereof will not be provided repeatedly.

The negative electrode paste can be applied to the surface of the negative electrode current collector 21 with the application device used for application of the positive electrode paste. Accordingly, detailed description thereof will not be provided repeatedly.

<Separator>

Figure 4:
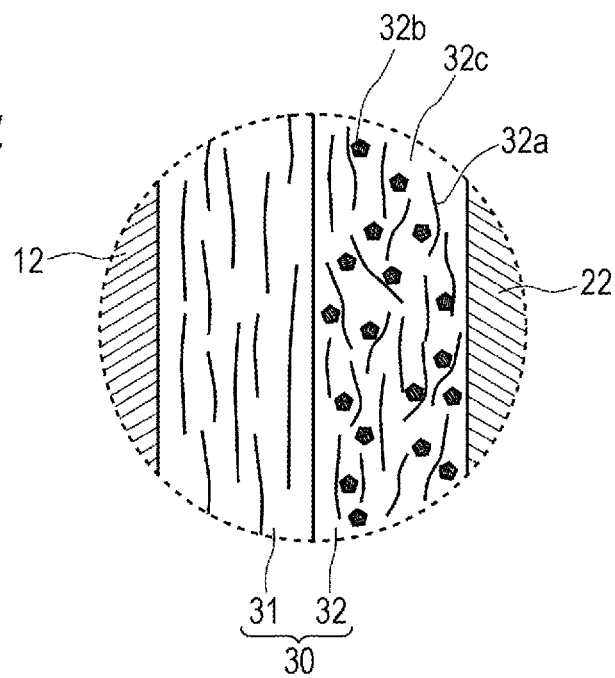
FIG. 4 is a schematic sectional view of a configuration of a separator, showing an enlarged part within a circle indicated by a broken line in FIG. 3.

The separator 30 partitions between the positive electrode 10 and the negative electrode 20 as well as allows the nonaqueous electrolyte contained in the electrolyte solution E to permeate therethrough. FIG. 4 is a schematic sectional view of a cross sectional configuration of the separator 30, showing an enlarged part within a circle X indicated by a broken line in FIG. 3. The separator 30 includes a substrate 31 in a sheet shape and a coating layer 32 coating the substrate 31.

The substrate 31 is uniaxially drawn to improve strength in the longitudinal direction (in other words, an MD direction). The substrate 31 can have a drawing rate regulated to 110 to 300%, and preferably 150 to 200%. The substrate 31 is made of a porous material such as a porous sheet or non-woven fabric. The porous material preferably has air permeability of at least 150 sec/cc, which is measured in accordance with JIS P 8117, so as to secure sufficient capability of sucking the electrolyte solution E by the separator 30. Examples of the material for the substrate 31 include polyolefin resin such as polyethylene (PE) or polypropylene (PP), polyester resin such as polyethylene terephthalate (PET) or a polybutylene terephthalate (PBT), polyacrylonitrile resin, polyphenylene sulfide resin, polyimide resin, and fluororesin. The substrate 31 can be surface treated with a surfactant or the like.

The coating layer 32 reinforces the substrate 31 and is provided on at least one of the surfaces of the substrate 31. FIG. 4 exemplifies a case where the coating layer 32 is provided to the substrate 31 on the surface close to the negative electrode 20. Reinforcement of the substrate 31 with the coating layer 32 is to be described in detail later in the section "separator anisotropic structure". The coating layer 32 is made of a composite material containing fibers 32a, fillers 32b, and a binder 32c. The coating layer 32 made of the composite material effectively reinforces the substrate 31 and improves strength of the entire separator 30. The fibers 32a used herein have orientation. The "orientation" indicates the alignable property of the fibers 32a that each have a fiber length larger than a fiber diameter (with a large aspect ratio indicating a length ratio between a long side and a short side of a two-dimensional object) and have substantially aligned fiber length directions. In a case where the fibers 32a are mixed with resin that is uniaxially drawn at the draw ratio of 120% and at least 30% of the fibers 32a in the resin are aligned with their fiber lengths being substantially parallel with each other, the fibers 32a can be regarded as having orientation. (For example, the fibers can be defined as having an aspect ratio not less than a predetermined value (e.g. at least 5) and at least 30% of the fibers can be regarded as having angles not less than 30 degrees from the MD direction of the substrate.) The fibers 32a have an average fiber diameter preferably ranging from 2 to 200 nm and more preferably ranging from 20 to 150 nm. If the fiber diameter is less than 2 nm, the fibers themselves have insufficient strength and the oriented fibers 32a may not exert sufficient strength in the oriented direction. In contrast, if the fiber diameter exceeds 200 nm, the fibers 32a have high stiffness and may be difficult to be oriented. Examples of the fibers 32a having orientation include cellulose fibers, aramid fibers, and glass fibers. These fibers 32a can be surface treated by surface modification or the like for improvement in affinity with the binder 32c. The fillers 32b are added to suppress excessive slip of the fibers 32a in the coating layer 32. The fillers 32b provided between the fibers 32a generate appropriate resistance between the fibers 32a being oriented. The fibers 32a can have larger bonding strength via the fillers 32b. This leads to improvement in strength of the coating layer 32 itself. Preferred examples of the fillers 32b include inorganic particles. Such inorganic particles can be exemplified by oxide particles, nitride particles, ionic crystal particles, covalent crystal particles, clay particles, particles of a material derived from mineral resources or of an artificial material thereof, and the like. Examples of the oxide particles include particles of iron oxide, $SiO_2$, $Al_2O_3$, $TiO_2$, $BaTiO_2$, ZrO, and alumina-silica composite oxide. Examples of the nitride particles include particles of aluminum nitride and silicon nitride. Examples of the ionic crystal particles include particles of calcium fluoride, barium fluoride, and barium sulphate. Examples of the covalent crystal particles include particles of silicon and diamond. Examples of the clay particles include particles of talc and montmorillonite. Examples of particles of a material derived from mineral resources or of an artificial material thereof include particles of boehmite (hydrated alumina), zeolite, appetite, kaolin, mullite, spinel, olivine, sericite, bentonite, and mica. The fillers 32b have an average particle diameter preferably ranging from 2 to 3000 nm and more preferably ranging from 10 to 500 nm. If the fillers 32b are sized to be less than 2 nm, the fillers 32b are likely to pass through the oriented fibers 32a and may not be able to sufficiently enhance bonding strength between the fibers 32a. In contrast, if the fillers 32b are sized to exceed 3000 nm, the fillers 32b have deteriorated dispersibility and may not be able to uniformly form the coating layer 32. In addition, if the fillers 32b enter the porous structure of the substrate 31, the fillers 32b may inhibit permeation of the electrolyte solution E. The binder 32c has only to bond the fibers 32a and the fillers 32b, and can be of the hydrophilic type or the hydrophobic type, similarly to the binder used for production of the positive electrode 10 or the negative electrode 20. A method of orienting the fibers so as to be angled from the MD direction can include partially immersing a roller in a container containing the oriented fibers to be picked up and gravure coated. The fibers can be alternatively oriented in accordance with a different method. For example, the fibers immersed in a coating solution can be oriented in a container, or the fibers can be oriented with plate having a laterally long recess. However, the present invention is not limited to these methods. The present invention exemplifies the separator including the substrate and the coating layer.

The present invention needs not be limited to this configuration in terms of functions and effects of the present invention. The separator can alternatively have a three-layer structure including a polyethylene layer and two polypropylene layers vertically sandwiching the polyethylene layer (a stuck separator). Still alternatively, the substrate can be coated with aramid (a coating layer made of aramid fibers). The separator can be a bonding separator bonded to the electrodes. The present invention is applicable also to a case where the separator having a single layer structure and an electrolyte including a polymer or polymer gel have structurally anisotropic orientation due to combination of the separator and the electrolyte. The separator can be produced through a wet process using a solvent or through a dry process not using any solvent.

(Electrolyte Solution)

The electrolyte solution E helping movement of Li ions includes a nonaqueous solvent and an electrolyte salt dissolved in the nonaqueous solvent. Examples of the nonaqueous solvent include cyclic carbonates such as propylene carbonate, ethylene carbonate, butylene carbonate, chloroethylene carbonate, and vinylene carbonate, cyclic esters such as γ-butyrolactone and γ-valerolactone, and chain carbonates such as dimethyl carbonate, diethyl carbonate, and ethyl methyl carbonate. Each of the nonaqueous solvents exemplified above can be used alone or a mixture of two or more of the nonaqueous solvents can be used alternatively. The electrolyte salt can be an Li ion salt, examples of which include $LiPF_6$, $LiClO_4$, $LiBF_4$, $LiAsF_6$, and $LiSbF_6$. Each of the electrolyte salts exemplified above can be used alone or a mixture of two or more of the electrolyte salts can be used alternatively.

(Separator Anisotropic Structure)

For production of the lithium ion battery 100, the power generating element 50 is formed by winding a layered product including the positive electrode 10, the negative electrode 20, and the separator 30 partitioning between these electrodes being layered, with a winding device. The separator 30 is formed through the substrate forming step of forming the substrate 31 in a sheet shape by uniaxially drawing a porous material and the coating layer forming step of forming the coating layer 32 by applying, to at least one of the surfaces of the substrate 31, a material containing resin (the composite material containing the fibers 32a, the fillers 32b, and the binder 32c). Deformation and tear of the separator 30 is relevant to the fact that the substrate 31 to be included in the separator 30 is drawn in a specific direction. The substrate 31 in a sheet shape, which is formed by uniaxially drawing a porous material in the substrate forming step, is increased in strength in the MD direction agreeing with the drawing direction and becomes durable against the winding process. In contrast, the substrate 31 may not keep sufficient strength in the TD direction perpendicular to the drawing direction, with no drawing effect.

In order to achieve sufficient strength of the substrate 31 also in the TD direction, the inventors of the present invention found, through intensive researches, that, by applying the composite material onto the substrate 31 in a direction different from the drawing direction (the MD direction) in the coating layer forming step of forming the coating layer 32, the separator 30 including the substrate 31 and the coating layer 32 thus oriented can be improved in entire strength. The inventors confirmed that the coating layer 32 provided on the substrate 31 has a unique structure with orientation in a direction different from the drawing direction of the substrate 31. This unique structure of the coating layer 32 is called the "anisotropic structure" in the present description. The anisotropic structure of the coating layer 32 is achieved mainly by the oriented fibers 32a contained in the composite material. Accordingly, the fibers 32a to be contained in the composite material preferably have the orientation.

The separator 30 including the substrate 31 and the coating layer 32 having the anisotropic structure and layered thereon is reinforced by the coating layer 32 with good balance in the TD direction of the separator, along which strength is difficult to be kept only by the substrate 31. A ratio ($S_{TD}/S_{MD}$) between tensile strength $S_{TD}$ in the direction (the TD direction) perpendicular to the drawing direction of the substrate 31 and tensile strength $S_{MD}$ in the drawing direction (the MD direction) of the substrate 31 is preferably regulated to at least 0.3. Furthermore, the tensile strength $S_{TD}$ is preferably regulated to be at least 40 N/mm². The tensile strength $S_{TD}$ in the TD direction of the separator 30 is kept to be not less than a certain level by regulating the tensile strength in this manner, so as to reliably prevent deformation and tear of the separator.

Described below is the separator 30 in the anisotropic structure achieving the unique feature of the energy storage device according to each of three representative embodiments of the present invention.

First Embodiment

Figure 5:
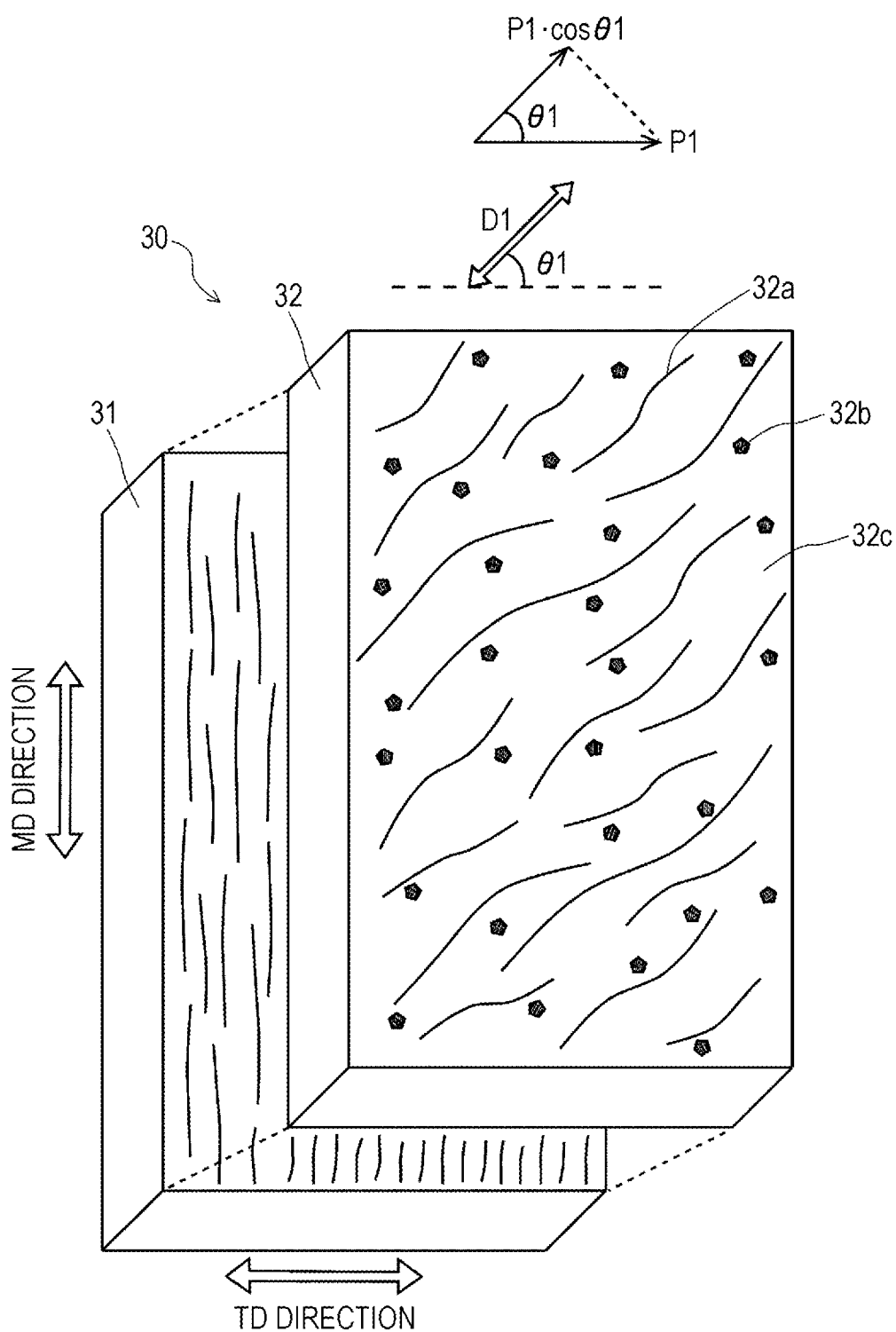
FIG. 5 is a schematic exploded perspective view of a configuration of a separator according to a first embodiment.

FIG. 5 is a schematic exploded perspective view of a configuration of the separator 30 according to the first embodiment. The separator 30 includes the uniaxially drawn substrate 31 and the coating layer 32 coating a surface of the substrate 31. As shown in FIG. 5, the substrate 31 is drawn in the MD direction (the vertical direction on the sheet). The substrate 31 is thus improved in strength in the MD direction but is likely to be deformed and torn in the TD direction. The coating layer 32 is formed by applying the composite material containing the fibers 32a, the fillers 32b, and the binder 32c along an arrow in a D1 direction. The D1 direction is different from the MD direction agreeing with the drawing direction of the substrate. The fibers 32a in the coating layer 32 are thus mostly oriented in the D1 direction. The coating layer 32 thus has the anisotropic structure with orientation in the D1 direction.

Considered below is a case where tensile force P1 in the TD direction is applied to the substrate 31 in the separator 30 according to the first embodiment. The tensile force P1 in the TD direction is applied to the substrate 31 as well as to the coating layer 32. However, the tensile force P1 can be partially reduced by the fibers 32a in the coating layer 32. Assuming that the D1 direction and the TD direction form an angle θ1, the fibers 32a in the coating layer 32 can receive force P1·cos θ1 as a vector component obtained by dispersing the tensile force P1 into the D1 direction in the first embodiment. Accordingly, the tensile force P1 will not be applied entirely to the substrate 31. The coating layer 32 having the anisotropic structure reinforces the substrate 31 in a direction other than the MD direction as described above, so as to suppress deformation and tear of the separator 30.

Second Embodiment

Figure 6:
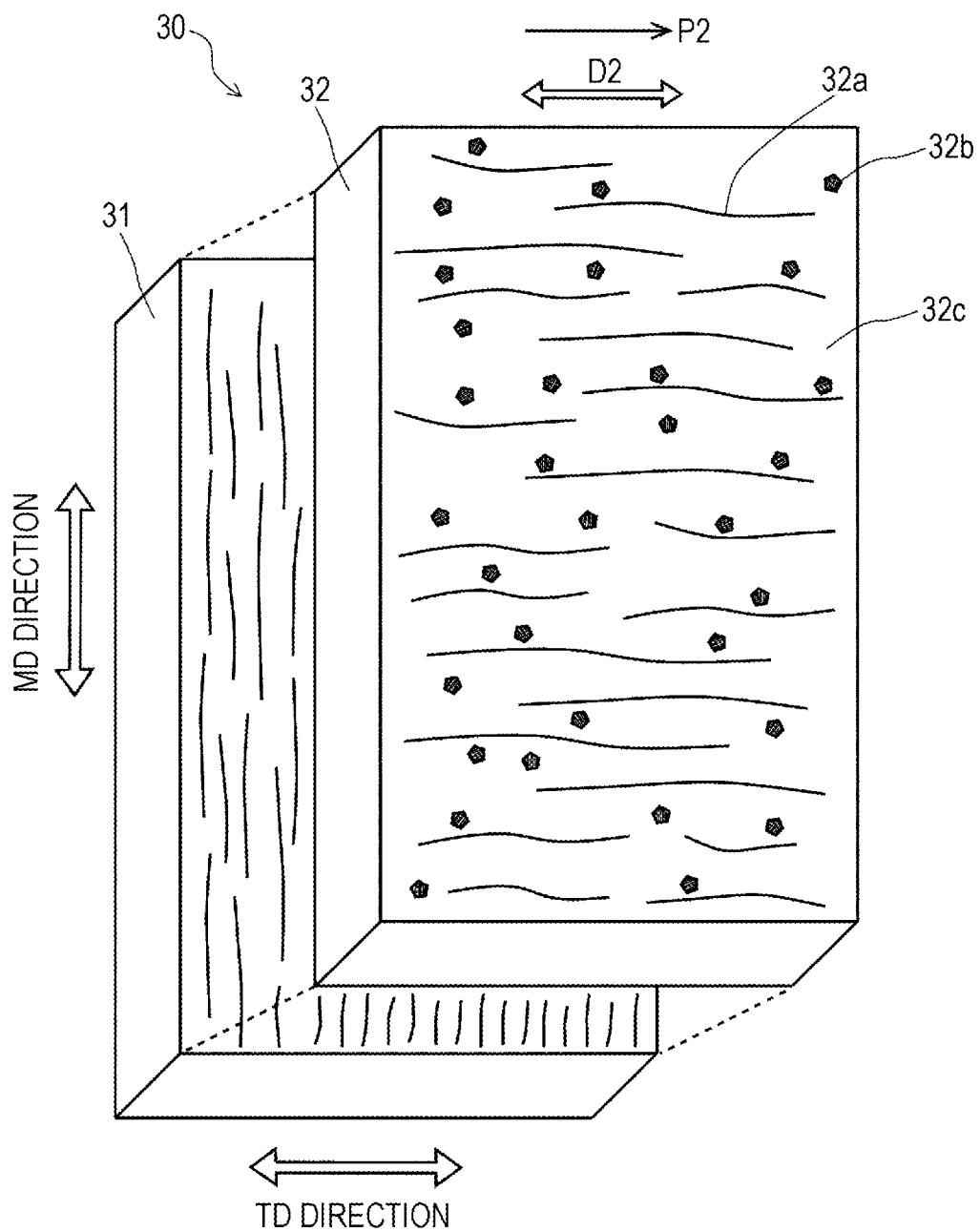
FIG. 6 is a schematic exploded perspective view of a configuration of a separator according to a second embodiment.

FIG. 6 is a schematic exploded perspective view of a configuration of the separator 30 according to the second embodiment. The separator 30 includes the uniaxially drawn substrate 31 and the coating layer 32 coating a surface of the substrate 31. The substrate 31 is structured similarly to that according to the first embodiment, and will not be described repeatedly in detail. The coating layer 32 is formed by applying the composite material containing the fibers 32a, the fillers 32b, and the binder 32c along an arrow in a D2 direction. The D2 direction substantially agrees with the direction perpendicular to the MD direction agreeing with the drawing direction of the substrate, namely, the TD direction. The fibers 32a in the coating layer 32 are thus mostly oriented in the D2 direction. The coating layer 32 thus has the anisotropic structure with orientation in the D2 direction. The anisotropic structure in this case is particularly called a "vertically oriented structure".

Considered below is a case where tensile force P2 in the TD direction is applied to the substrate 31 in the separator 30 according to the second embodiment, similarly to the first embodiment. The tensile force P2 in the TD direction is applied to the substrate 31 as well as to the coating layer 32. However, the tensile force P2 can be mostly reduced by the fibers 32a in the coating layer 32. The D2 direction and the TD direction substantially agree with each other in the second embodiment. The fibers 32a in the coating layer 32 can receive the entire tensile force P2. Accordingly, most of the tensile force P2 will not be applied to the substrate 31. The coating layer 32 having the vertically oriented structure can reliably reinforce the substrate 31 in the TD direction as described above, so as to suppress deformation and tear of the separator 30.

Third Embodiment

Figure 7:
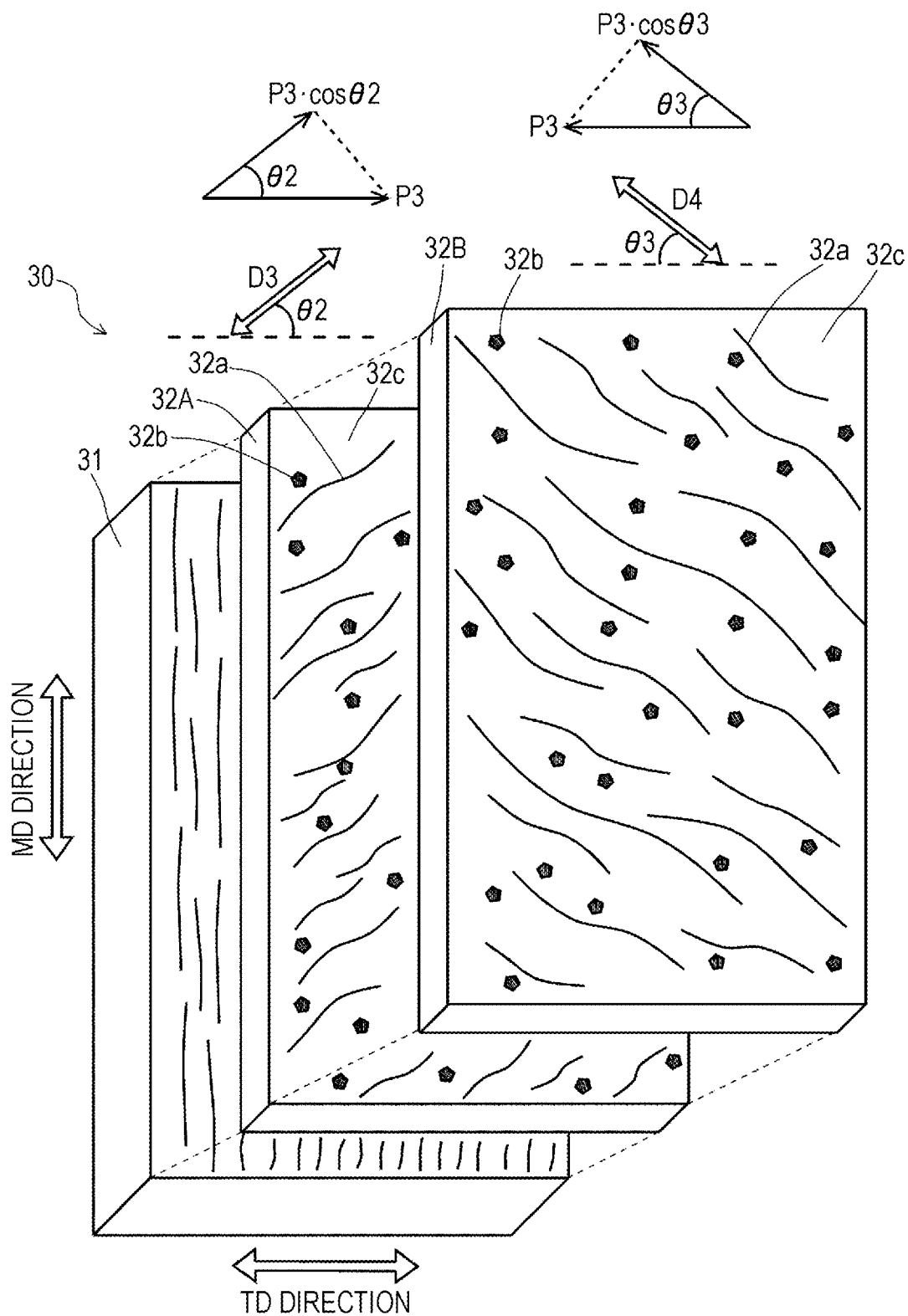
FIG. 7 is a schematic exploded perspective view of a configuration of a separator according to a third embodiment.

FIG. 7 is a schematic exploded perspective view of a configuration of the separator 30 according to the third embodiment. The separator 30 includes the uniaxially drawn substrate 31 and the coating layer 32 coating a surface of the substrate 31. The substrate 31 is structured similarly to that according to the first embodiment, and will not be described repeatedly in detail. The coating layer 32 is formed by applying twice, the composite material containing the fibers 32a, the fillers 32b, and the binder 32c. The composite material is firstly applied along an arrow in a D3 direction whereas the composite material is secondly applied along an arrow in a D4 direction. The substrate 31 is thus provided thereon with a first coating layer 32A and a second coating layer 32B. The fibers 32a in the first coating layer 32A are thus mostly oriented in the D3 direction whereas the fibers 32a in the second coating layer 32B are thus mostly oriented in the D4 direction. Accordingly, in the coating layer 32, the first coating layer 32A has the anisotropic structure with orientation in the D3 direction whereas the second coating layer 32B has the anisotropic structure with orientation in the D4 direction. The D3 direction and the D4 direction are symmetric with respect to a line in the MD direction agreeing with the drawing direction of the substrate 31. The anisotropic structure in this case is particularly called a "symmetrically oriented structure".

Considered below is a case where tensile force P3 in the TD direction is applied to the substrate 31 in the separator 30 according to the third embodiment, similarly to the first embodiment. The tensile force P3 in the TD direction is applied to the substrate 31 as well as to the coating layer 32. However, the tensile force P3 can be partially reduced by the fibers 32a in the coating layer 32. Assuming that the D3 direction and the TD direction form an angle θ2 and the D4 direction and the TD direction form an angle θ3, the fibers 32a in the first coating layer 32A can receive force P3·cos θ2 as a vector component obtained by dispersing the tensile force P3 into the D3 direction in the third embodiment.

Furthermore, the fibers 32a in the second coating layer 32B can receive force P3·cos θ3 as a vector component obtained by dispersing the tensile force P3 into the D4 direction. The D3 direction and the D4 direction are symmetric with respect to a line in the MD direction agreeing with the drawing direction of the substrate 31 as described above. The angle θ2 and the angle θ3 are formed oppositely to each other in position but are equal in degree. The force P3·cos θ2 and the force P3·cos θ3 are thus equal in strength and are dispersed with good balance to the opposite sides of the separator 30. Accordingly, most of the tensile force P3 will not be applied to the substrate 31. The coating layer 32 having the symmetrically oriented structure can reinforce the substrate 31 in the TD direction with good balance as described above, so as to suppress deformation and tear of the separator 30.

The coating layer 32 includes two layers in the third embodiment. Alternatively, the coating layer 32 can be provided to include three or more layers. Also in the case where the coating layer 32 includes three or more layers, the composite material has only to be applied to the substrate 31 such that at least two of the layers configure a symmetrically oriented structure.

Other Embodiments

The separator 30 according to each of the first to third embodiments includes the substrate 31 and the coating layer 32 having the anisotropic structure and layered on the substrate 31 to reinforce the substrate 31, so as to prevent deformation and tear of the separator 30. Deformation and tear of the separator 30 can be prevented also by devising the electrode. In the power generating element 50, the separator 30 and the negative electrode 20 are disposed such that the coating layer 32 in the separator 30 faces the negative composite layer 22 in the negative electrode 20. The negative electrode 20 can be kept in surface flatness by suppression of possibly occurring expansion in volume of the negative electrode 20 in the lithium ion battery 100 in use. In this case, the separator 30 is not excessively pressurized by the negative electrode 20 and deformation and tear of the separator 30 is prevented effectively. In this regard, the inventors found, through various consideration, that the negative active material in the negative electrode 20 containing hard carbon of a particle diameter (d50) ranging from 2 to 8 μm effectively suppresses expansion in volume of the negative electrode 20. When the separator 30 and the negative electrode 20 containing hard carbon of a particle diameter (d50) ranging from 2 to 8 μm are layered together, the negative electrode 20 will not apply excessive stress to the separator 30 even in a state where the coating layer 32 and the negative composite layer 22 face each other. This configuration and reinforcement of the substrate 31 by the coating layer 32 having the anisotropic structure according to each of the first to third embodiments synergistically reliably prevent deformation and tear of the separator 30.

The present invention is mainly applicable to a secondary battery (e.g. a lithium ion battery) included as a power source for a vehicle such as an electric vehicle (EV), a hybrid electric vehicle (HEV), or a plug-in hybrid electric vehicle (PHEV). The present invention is also applicable to a secondary battery (e.g. a lithium ion battery) included in a drive power source for a mobile communications terminal such as a mobile phone or a smartphone, or an information terminal such as a tablet type computer or a notebook computer.

What is claimed is:

1. An energy storage device comprising:
   a positive electrode provided with a positive composite layer containing a positive active material;
   a negative electrode provided with a negative composite layer containing a negative active material; and
   a separator partitioning between the positive electrode and the negative electrode,
   wherein the separator includes a substrate uniaxially drawn into a sheet shape and a coating layer coating at least one of surfaces of the substrate,
   the coating layer has an anisotropic structure with orientation in a direction different from a drawing direction of the substrate,
   the coating layer is made of a composite material containing fibers having orientation, fillers and a binder, the fibers being aramid fibers or cellulose fibers,
   a direction of the orientation of the coating layer corresponds to a direction of the orientation of the fibers, and
   the direction of the orientation of the fibers is different from the drawing direction of the substrate.

2. The energy storage device according to claim 1, wherein the coating layer has, as the anisotropic structure, a vertically oriented structure with orientation in a direction perpendicular to the drawing direction of the substrate.

3. The energy storage device according to claim 1, wherein the coating layer has, as the anisotropic structure, a symmetrically oriented structure symmetric with respect to a line in the drawing direction of the substrate.

4. The energy storage device according to claim 1, wherein the separator has a ratio ($S_{TD}/S_{MD}$) regulated to at least 0.3, between tensile strength $S_{TD}$ in a direction perpendicular to the drawing direction of the substrate and tensile strength $S_{MD}$ in the drawing direction of the substrate.

5. The energy storage device according to claim 1, wherein the separator has a tensile strength $S_{TD}$ in the direction perpendicular to the drawing direction of the substrate being regulated to at least 40 N/mm$^2$.

6. The energy storage device according to claim 1, wherein the negative active material is hard carbon having a particle diameter (d50) ranging from 2 to 8 μm.

7. The energy storage device according to claim 1, wherein
   the fibers have an aspect ratio of at least 5,
   at least 30% of the fibers have angles not less than 30 degrees from the drawing direction of the substrate, and
   the binder is at least one selected from a group consisting of polyacrylic acid (PAA), carboxymethyl cellulose (CMC), polyvinyl alcohol (PVA), polyethylene oxide (PEO), polyvinylidene fluoride (PVDF), ethylene-propylene-diene ternary copolymer (EPDM), sulfonated ethylene-propylene rubber, styrene-butadiene rubber (SBR), fluororubber, and polymeric salts or derivatives thereof.

8. The energy storage device according to claim 1, wherein
   the fibers have an aspect ratio of at least 5,
   at least 30% of the fibers have angles not less than 30 degrees from the drawing direction of the substrate,
   the binder is at least one selected from a group consisting of polyacrylic acid (PAA), carboxymethyl cellulose (CMC), polyvinyl alcohol (PVA), polyethylene oxide (PEO), polyvinylidene fluoride (PVDF), ethylene-propylene-diene ternary copolymer (EPDM), sulfonated ethylene-propylene rubber, styrene-butadiene rubber (SBR), fluororubber, and polymeric salts or derivatives thereof, and an average fiber diameter of the fibers is 2 nm or more and 200 nm or less.

9. An energy storage device comprising:

a positive electrode provided with a positive composite layer containing a positive active material;

a negative electrode provided with a negative composite layer containing a negative active material; and a separator partitioning between the positive electrode and the negative electrode, wherein the separator includes a substrate in a sheet shape and a coating layer coating at least one of surfaces of the substrate, the coating layer has an anisotropic structure with orientation in a direction different from a drawing direction of the substrate, the coating layer is made of a composite material containing fibers having orientation, fillers and a binder, the fibers being aramid fibers or cellulose fibers, a direction of the orientation of the coating layer corresponds to a direction of the orientation of the fibers, and the direction of the orientation of the fibers is different from the drawing direction of the substrate.

10. The energy storage device according to claim 9, wherein the fibers have an aspect ratio of at least 5, at least 30% of the fibers have angles not less than 30 degrees from the drawing direction of the substrate, and the binder is at least one selected from a group consisting of polyacrylic acid (PAA), carboxymethyl cellulose (CMC), polyvinyl alcohol (PVA), polyethylene oxide (PEO), polyvinylidene fluoride (PVDF), ethylene-propylene-diene ternary copolymer (EPDM), sulfonated ethylene-propylene rubber, styrene-butadiene rubber (SBR), fluororubber, and polymeric salts or derivatives thereof.

11. The energy storage device according to claim 9, wherein the fibers have an aspect ratio of at least 5, at least 30% of the fibers have angles not less than 30 degrees from the drawing direction of the substrate, the binder is at least one selected from a group consisting of polyacrylic acid (PAA), carboxymethyl cellulose (CMC), polyvinyl alcohol (PVA), polyethylene oxide (PEO), polyvinylidene fluoride (PVDF), ethylene-propylene-diene ternary copolymer (EPDM), sulfonated ethylene-propylene rubber, styrene-butadiene rubber (SBR), fluororubber, and polymeric salts or derivatives thereof, and an average fiber diameter of the fibers is 2 nm or more and 200 nm or less.

* * * * *